(12) United States Patent
Kaltenbach et al.

(10) Patent No.: US 8,585,522 B2
(45) Date of Patent: Nov. 19, 2013

(54) DRIVE TRAIN AND METHOD FOR OPERATING THE DRIVE TRAIN

(75) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 147 days.

(21) Appl. No.: 13/289,167

(22) Filed: Nov. 4, 2011

(65) Prior Publication Data

US 2012/0129638 A1    May 24, 2012

(30) Foreign Application Priority Data

Nov. 24, 2010  (DE) .......................... 10 2010 061 824

(51) Int. Cl.
*F16H 3/72* (2006.01)
*F16H 37/06* (2006.01)

(52) U.S. Cl.
USPC ............................................. 475/5; 475/218

(58) Field of Classification Search
USPC ................. 475/5, 207, 218; 477/3, 5
See application file for complete search history.

(56) References Cited

U.S. PATENT DOCUMENTS

| | | | |
|---|---|---|---|
| 7,427,252 B2 * | 9/2008 | Holmes | 475/5 |
| 2003/0045389 A1 * | 3/2003 | Kima | 475/5 |
| 2003/0078127 A1 * | 4/2003 | Kramer | 475/5 |
| 2009/0149294 A1 * | 6/2009 | Wallner et al. | 477/4 |
| 2010/0009805 A1 * | 1/2010 | Bachmann | 477/5 |
| 2010/0105517 A1 * | 4/2010 | Borntraeger | 477/3 |
| 2010/0203995 A1 * | 8/2010 | Zhang et al. | 475/5 |

FOREIGN PATENT DOCUMENTS

DE    10 2006 059 591 A1    6/2008

* cited by examiner

*Primary Examiner* — Erin D Bishop
*Assistant Examiner* — Huan Le
(74) *Attorney, Agent, or Firm* — Davis & Bujold, PLLC; Michael J. Bujold

(57) ABSTRACT

A drive train with a combustion engine, electric machine, and a transmission with first and second partial transmissions. The electric machine is coupled via a planetary transmission to input shafts of the first and second partial transmissions. The combustion engine can be coupled, via a separation clutch, to the input shaft of the second partial transmission and, when the separation clutch is engaged, the engine is also connected, via the planetary transmission, to the input shaft of the first partial transmission. A bridging shift element interacts with the planetary transmission such that, when the bridging shift element is engaged, the electric machine and the input shafts of the first and second partial transmissions are torsionally fixed so that they all rotate together. When the bridging shift element is disengaged, there is no torsionally fixed connection and those component rotate at different rotational speeds.

13 Claims, 2 Drawing Sheets

DRIVE TRAIN AND METHOD FOR OPERATING THE DRIVE TRAIN

Figure 1:
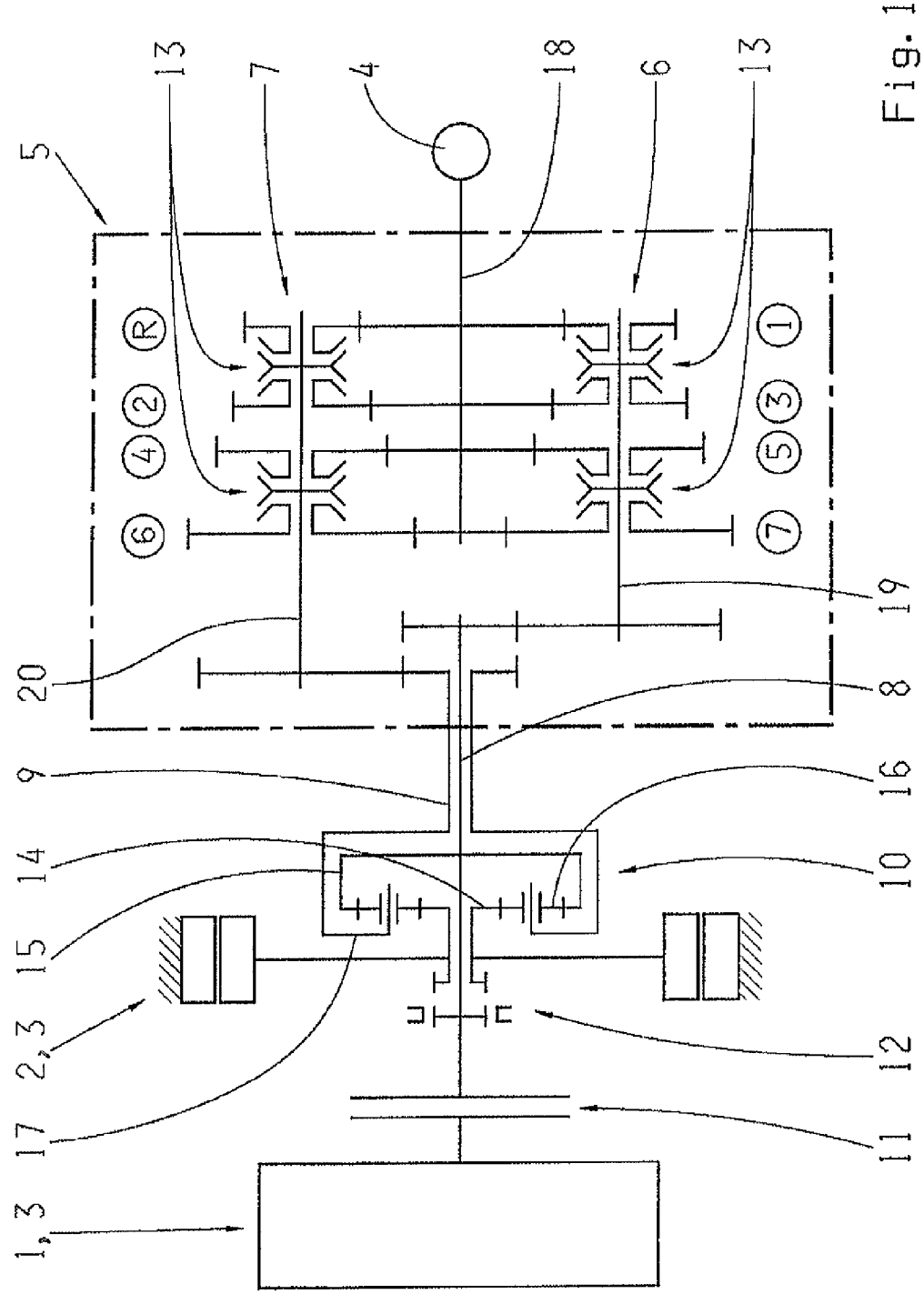

This application claims priority from German Application Serial No. 10 2010 061 824.1 filed Nov. 24, 2010.

FIELD OF THE INVENTION

The invention concerns a drive train of a hybrid vehicle. In addition, the invention concerns a method for operating a drive train of a hybrid vehicle.

BACKGROUND OF THE INVENTION

Known from DE 10 2006 059 591 A1 is a drive train of a hybrid vehicle which comprises a drive assembly having a combustion engine and an electric machine. Positioned between the drive assembly and an output is a transmission with two parallel installed partial transmissions, whereby the electric machine, by means of an inserted planetary transmission or via a planetary transmission, as the case may be, is linked to an input shaft of a second partial transmission which is installed in parallel with the first partial transmission. The combustion engine can be linked to an input shaft of the second partial transmission via a separation clutch, and is also linked via the planetary transmission, when the separation clutch engaged, with the input shaft of the first partial transmission.

SUMMARY OF THE INVENTION

Based on these facts, the object of the present invention is to develop a novel drive train of a hybrid vehicle as well as a novel method for operating the drive train of a hybrid vehicle. Hereby, a bridging shift element interacts with the planetary gear in a way such that, when the bridging element is engaged, a torsionally fixed connection exists between the electric machine, the input shaft of the first partial transmission, and the input shaft of the second partial transmission, and therefore they each rotate at the same rotational speed, but this torsionally fixed connection between the electric machine and both input shafts of both partial transmissions does not exist when the bridging shift element is disengaged and thus, they stop rotating at the same rotational speed.

At the time when the separation clutch is disengaged and the bridging shift element bridges the planetary transmission, one can drive with the drive train in a pure electric mode whereby just at that time one gear has to be engaged in one partial transmission. The rotational losses of the planetary transmission can hereby be avoided.

A first inventive method for operating a drive train includes, at the time, when the previously engaged bridging shift element needs to be disengaged, to disengage the bridging element and to change it to a load-free condition, is achieved through a change of the torque which is provided by the combustion engine and through a change of the torque which is provided by the electric machine, and is disengaged under a load-free condition. Through this inventive method, which can be applied to a drive train with or without a separation clutch, the bridging shift element can be changed safely into the load-free condition, so that the bridging shift element can safely be disengaged in a load-free condition. If the drive train has a separation clutch, the separation clutch is in this case engaged.

A second inventive method includes, at the time when the combustion engine is linked to the input shaft of the second partial transmission via the separation clutch, the separation clutch is disengaged for pure electric drive and the bridging shift element is engaged, whereby a gear is engaged in the first partial transmission or second partial transmission for the pure electric drive.

BRIEF DESCRIPTION OF THE INVENTION

Examples of the embodiments of the invention are, but not limited to, explained based on the drawing. These show:

FIG. 1 a schematic view of the inventive drive train of a hybrid vehicle; and

Figure 2:
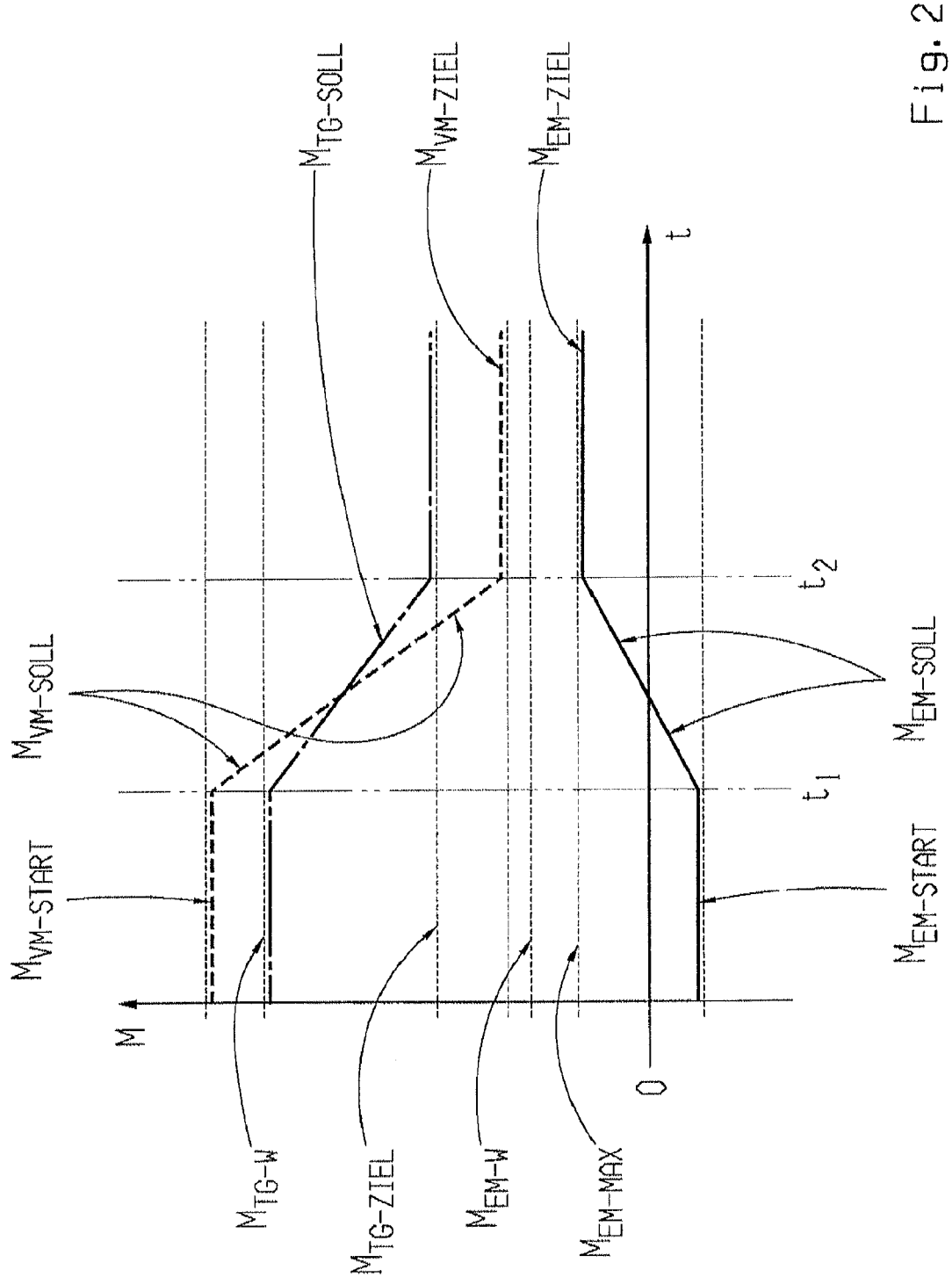

FIG. 2 a diagrammatic view to explain the inventive method for the operating of such drive train

DETAILED DESCRIPTION OF THE DRAWINGS

FIG. 1 shows a scheme of an inventive drive train of a motor vehicle. The drive train in FIG. 1 comprises of a combustion engine 1 and an electric machine 2 and forms a drive assembly 3, and a transmission 5 is positioned between the drive assembly 3 and the output 4. The transmission 5 comprises of two partial transmissions 6 and 7 which are, for all intents and purposes, positioned in parallel with each other, in the shown embodiment example the partial transmission 6 provides the forward gears "1", "3", "5", and "7", while the partial transmission 7 provides the forward gears "2", "4", "6", as well as the reverse gear "R".

To provide the forward gears, as well as the reverse gear, the partial transmissions 6 and 7 of the transmission 5 comprise shift elements 13. The construction and positioning of the partial transmissions 6 and 7 is known in double clutch transmissions which are known to a person skilled in the art.

The electric machine 2 of the drive assembly 3 connects to an input shaft 9 of the first partial transmissions 7 of the partial transmissions 6 and 7, and connects to an input shaft 8 of a second partial transmission 6 of the partial transmissions 6 and 7 via a planetary transmission 10. The combustion engine 1 of the drive assembly 3 is linked to the input shaft 8 of the second partial transmission 6 via a separation clutch 11, whereby, when the separation clutch 11 is engaged, the combustion engine 1 is also linked via the planetary gear 10 to the input shaft 9 of the first partial transmission 7.

Shown in the planetary transmission 10 of FIG. 1 are a planetary gear 14, a ring gear 15, planetary gears 16, as well as a planetary carrier 17. The planetary carrier 17 is connected to the input shaft 9 of the first partial transmission 7. The electric machine 2 of the drive assembly 3 is connected to the sun gear 14 of the planetary transmission 10.

Regarding that basic construction, the drive train in FIG. 1 corresponds with the drive train of DE 10 2006 059 591 A1, and its teaching is explicitly referenced.

In the inventive drive train, the planetary transmission 10 interacts with a bridging shift element 12 in such a way that when the bridging shift element 12 is engaged, a torsionally fixed connection between the electric machine 2, the input shaft 9 of the first partial transmission 7, and the input shaft 8 of the second partial transmission 6 exists, such that they rotate at the same rotation speed, and when the bridging shift element 12 is disengaged, this torsionally fixed connection between the electric machine 2 and the two input shafts 8, 9 of the two partial transmissions 6, 7 and thus rotation at the same rotational speed does not exist.

The bridging shift element 12 is preferably designed as a form-fitting claw clutch.

When the bridging shift element 12 is engaged, it connects the separation clutch 11 and the electric machine 2. The bridging shift element 12 acts, in its engaged condition, as a bridging element for the planetary gear 10. If the planetary 10 is bridged, one can drive in a pure electric mode with a disengaged separation clutch 11, to avoid rotational losses of the planetary gear 10, when a gear is engaged only in the second partial transmission 6 or only in the first partial transmission 7.

When the planetary transmission 10 is bridged, the electric machine 2 does not need to support a torque. In addition, with a bridged planetary transmission 10, the electric machine can be fully applied in a boost operation and recuperation operation.

The present invention concerns also a method for operating a drive train of a hybrid vehicle, especially the drive train shown in FIG. 1.

With reference to the drive train of FIG. 1 when the separation clutch 11 is engaged or if the separation clutch 11 is not present, the previously engaged bridging shift element 12 can, by means of the inventive method, be disengaged by bringing it into a load-free condition by changing the torque which is provided by the combustion engine 1 and by changing the torque provided by the electric machine 2, then during the load-free condition, the bridging shift element 12 is disengaged.

The torques of the combustion engine 1 and the electric machine 2 are thus respectively changed in a such a way, that the bridging shift element 12 is made load-free, so that it can be disengaged under a load-free condition.

The change of a bridging shift element 12 into a load-free condition and the disengagement of it in a load-free condition takes place especially when a load shift from the first partial transmission 7 to the second partial transmission 6 is intended, then prior to executing the shift, the previously engaged bridging shift element 12, is brought into a load-free condition and is then disengaged under the load-free condition.

The first partial transmission 7, in which the current gear is engaged in the load shift to be executed, is also described as being a disengaging partial transmission, and the second partial transmission 6, in which the target gear needs to be engaged in the shift to be executed, is described as being an engaging partial transmission.

In the following, it is assumed (see FIG. 2) that when the bridging shift element 12 needs to become load-free prior to the execution of a load shift and needs to be disengaged, the combustion engine 1 needs to provide a start torque $M_{VM\text{-}START}$ and the electric machine 2 needs to provide a start torque $M_{EM\text{-}START}$ so that prior of the execution of the load shift the partial transmission 7, which will be disengaged, transfers a desired torque $M_{TG\text{-}W}=M_{VM\text{-}START}+M_{EM\text{-}START}$. It is further assumed that the electric machine 2 can provide, for example depending on a temperature and a charge condition of an energy storage, a maximum torque $M_{EM\text{-}MAX}$ and that the planetary gear 10 has a so-called idle transmission ratio i0.

The diagram in FIG. 2 explains the inventive method for a planetary gear 10 with an idle ratio i0=−2.

Prior to the execution of a load shift, to bring the bridging shift element 12 into a load-free condition and to disengage it in the load-free condition, a nominal value curve $M_{VM\text{-}SOLL}$ for the torque provided by the combustion engine 1 is calculated from the start torque $M_{VM\text{-}START}$ of the combustion engine 1, the start torque $M_{EM\text{-}START}$ of the electric machine 2, and the desired torque $M_{TG\text{-}W}$ of disengaging the first partial transmission 7, namely from the start torque $M_{VM\text{-}START}$ to a target torque $M_{VM\text{-}ZIEL}$.

Also, a nominal value curve $M_{EM\text{-}SOLL}$ is calculated for the torque of the electric machine 2, to convert the torque which is provided by the electric machine 2 from its start torque $M_{EM\text{-}START}$ to a target torque $M_{VM\text{-}ZIEL}$.

When the target torque $M_{VM\text{-}ZIEL}$ of the combustion engine 1, as well as the target torque $M_{EM\text{-}ZIEL}$ of the electric machine 2 are reached, the bridging shift element 12 is load-free and can be disengaged load-free.

The target torque $M_{EM\text{-}ZIEL}$ of the electric machine 2 for the nominal-value curve $M_{EM\text{-}SOLL}$ is calculated in accordance with the following equations:

$$M_{EM\text{-}ZIEL}=\text{MIN}(M_{EM\text{-}W};\ M_{EM\text{-}MAX}),$$

$$M_{EM\text{-}W}=M_{TG\text{-}W}/1-i0),$$

whereby $M_{EM\text{-}MAX}$ is the maximum provided torque of the electric machine 2, whereby $M_{TG\text{-}W}$ is the desired torque of the disengaged first partial transmission 7, and whereby i0 is the idling ratio of the planetary gear 10.

The target torque $M_{VM\text{-}ZIEL}$ of the combustion engine 1 for the Nominal-Value pattern $M_{VM\text{-}SOLL}$ is calculated in accordance with the following equation:

$$M_{VM\text{-}ZIEL}=M_{EM\text{-}ZIEL}*(-i0)$$

The above equations take into consideration that the torque which is provided by the electric machine 2 is limited by the maximum torque $M_{EM\text{-}MAX}$. It is thus accepted that the provided traction force declines during the execution of the load shift.

As already mentioned, a nominal value curve $M_{VM\text{-}SOLL}$ or $M_{EM\text{-}SOLL}$ will be calculated for each torque to be provided by the combustion engine 1, as well as the electric machine 2, beginning at each of the start torque $M_{VM\text{-}START}$ or $M_{EM\text{-}START}$, respectively, and moving towards the respective target torque $M_{VM\text{-}ZIEL}$ or $M_{EM\text{-}ZIEL}$ respectively, whereby the nominal value curve $M_{VM\text{-}SOLL}$ and $M_{EM\text{-}SOLL}$ run between the respective start torque and the respective target torque, in accordance with FIG. 2, in a linear form or ramp-like, respectively.

The torque provided by the combustion engine 1 and the torque provided by the electric machine 2 are preferably adjusted according to the nominal value curves $M_{VM\text{-}SOLL}$ and $M_{EM\text{-}SOLL}$, so that within a fixed, defined time interval, which is defined as time t1 and time t2, the torque which is provided by the combustion engine 1 and the electric machine 2 match the target torques $M_{VM\text{-}ZIEL}$ and $M_{EM\text{-}ZIEL}$. Thus, when the time t2 is reached, the bridging shift element 12 is load-free and can load-free be disengaged. The torque $M_{TG\text{-}SOLL}$ which needs to be transferred by the disengaged partial transmission 7 corresponds hereby with $M_{VM\text{-}SOLL}$ $M_{EM\text{-}SOLL}$. It also applies: $M_{TG\text{-}ZIEL}=M_{VM\text{-}ZIEL}+M_{EM\text{-}ZIEL}$.

An actuator for actuating the bridging shift element 12 can, in an advantageous enhanced embodiment of the invention, already be preloaded at the time t2 and thus prior to reaching the target torques $M_{VM\text{-}ZIEL}$ and $M_{EM\text{-}ZIEL}$.

In addition, an advantageous, further embodiment of the invention allows the nominal value curves $M_{VM\text{-}SOLL}$ and $M_{EM\text{-}SOLL}$ to continue beyond their target torques. It applies at least to lowering of the torque which is provided by the combustion engine 1, since the torque provided by the electric machine 2 possibly may not be increased any further. Thus, the disengagement or rather the opening of the bridging shift element 12 can be improved.

Also, another advantageous further embodiment of the invention provides that the torques of the combustion engine 1 and the electric machine 2, at which the bridging shift element 12 actually disengages, can be stored and used in terms of adapting the next disengagement procedure of the bridging shift element 12.

Thereafter, the target gear for the shift under load can be selected in the engaging partial transmission 6 and then the load reduction can be executed at the electric machine 2, so that the load of the disengaging partial transmission 7 is transferred to the engaging partial transmission 6.

After execution of the shift of load, the present gear of the disengaging partial transmission 7 can be disconnected.

Also, after execution of the shift of load, the rotational speed of the electric machine 2 can be adjusted in such a way that the planetary transmission 10 is rotationally blocked, whereby the blocked rotation of the planetary transmission 10 represents a rotational speed synchronism of the sun gear 14, the ring gear 15, and the planetary gears 16 of the planetary transmission 10.

Also, the bridging shift element 12 can again be engaged after the execution of the shift under load, to use the electric machine 2 thereafter for a boost or a recuperation without reactive power losses of the electric machine 2.

With the drive train as in FIG. 1, which comprises the separation clutch 11, an additional method in accordance with the invention which allows pure electric drive of the drive train can be realized by engaging the bridging shift element 12, whereby the planetary transmission 10 is bridged. The electric machine 2 can be used under this condition for pure electric drive without rolling losses of the planetary gear 10, where a gear is engaged exclusively in the partial transmissions 6 or exclusively in the partial transmission 7.

The transmission 5 with its two partial transmissions 6 and 7 is a manual transmission with its two input shafts 8 and 9 and an output shaft 18 which is linked to the output 4. An input shaft 9 is designed as a hollow shaft in which the other input shaft 8 runs coaxially. Assigned to the shift elements 13 of the partial transmission 6 and 7 are lay shafts 19 and 20 of the partial transmission 6 and 7. The gear set of the partial transmission 6 and 7 shown in FIG. 1 and the shown division of its gears is of exemplary nature.

REFERENCE CHARACTERS

1 Combustion Engine
2 Electric Machine
3 Drive Aggregate
4 Output
5 Transmission
6 Partial Transmission
7 Partial Transmission
8 Input Shaft
9 Input Shaft
10 Planetary Transmission
11 Separation Clutch
12 Bridging Shift Element
13 Shift Element
14 Sun Gear
15 Ring Gear
16 Planetary Gear
17 Planetary Carrier
18 Output Shaft
19 Lay Shaft
20 Lay Shaft

The invention claimed is:

1. A drive train of a hybrid vehicle comprising:
a drive assembly (3) comprising a combustion engine (1) and an electric machine (2);
a transmission (5) comprising at least first and second partial transmissions (6, 7) being located between the drive assembly (3) and an output (4);
the electric machine (2) being connected, via a planetary transmission (10), to an input shaft (9) of the first partial transmission (7) and an input shaft (8) of the second partial transmission (6) which is arranged parallel to the first partial transmission (7);
the combustion engine (1) being connectable, via a separation clutch (11), to the input shaft (8) of the second partial transmission (6), and
the combustion engine (1), when the separation clutch (11) is engaged, being connected to the input shaft (9) of the first partial transmission (7), via the planetary transmission (10);
a bridging shift element (12) interacting with the planetary transmission (10) such that the bridging shift element is only either fully engaged or fully disengaged:
when the bridging shift element (12) is engaged, a torsionally fixed connection exists between the electric machine (2), the input shaft (9) of the first partial transmission (7) and the input shaft (8) of the second partial transmission (6) such that they all rotate at a same rotational speed, and
when the bridging shift element (12) is disengaged, the torsionally fixed connection between the electric machine (2), the input shaft (9) of the first partial transmission (7) and the input shaft (8) of the second partial transmission (6) is interrupted so that they can rotate at different rotational speeds.

2. The drive train according to claim 1, wherein the bridging shift element (12) is positioned between the separation clutch (11) and the electric machine (2).

3. The drive train according to claim 1, wherein the bridging shift element (12) is a form-fit claw clutch.

4. A method of operating a drive train comprising a drive assembly (3) having a combustion engine (1) and an electric machine (2), a transmission (5) having at least first and second partial transmissions (6, 7) positioned between the drive assembly (3) and an output (4), the electric machine (2) being connected, via a planetary transmission (10), to an input shaft (9) of the first partial transmission (7) and to an input shaft (8) of the second partial transmission (6) which is arranged parallel to the first partial transmission (7), a bridging shift element (12) interacting with the planetary transmission (10) such that when the bridging shift element (12) is engaged, a torsionally fixed connection exists between the electric machine (2), the input shaft (9) of the first partial transmission (7) and the input shaft (8) of the second partial transmission (6) which are thereby constrained so as to rotate at a same rotational speed, but when the bridging shift element (12) is disengaged, the torsionally fixed connection between the electric machine (2) and the input shafts (8, 9) of the first and the second partial transmissions (6, 7) is interrupted and there is no mandatory rotation speed synchronism, the method comprising the steps of:
bringing the bridging shift element (12) to a load-free condition by changing torque provided by the combustion engine (1) and changing torque provided by the electric machine (2);
disengaging the bridging shift element (12) under the load-free condition;
executing a shift under load by disengaging the first partial transmission (7) and engaging the second partial transmission (6), the previously engaged bridging shift element (12) becomes load-free prior to the execution of the shift under load and is disengaged under the load-free condition; and calculating, from a start torque of the combustion engine (1) and from a start torque of the electric machine (2) and from a desired torque of the disengaging first partial transmission, a nominal value curve for the torque which is provided by the combustion engine from its start torque to its target torque, and calculating a nominal value curve for the torque of the electric machine, from its start torque to its target torque, whereby the torque which is provided by the combustion engine (1) and the torque which is provided by the electric machine (2) track the respective nominal value curve which brings the bridging shift element (12) to the load-free condition.

5. The method according to claim 4, further comprising the step of controlling the torque which is provided by the combustion engine (1) and the torque which is provided by the electric machine (2) tracking the respective nominal value curve.

6. The method according to claim 4, further comprising the step of synchronizing the rotational speed of the combustion engine, when the bridging shift element (12) is disengaged, for the execution for a shift under load, in a way such that the rotational speed of the combustion engine matches the target gear of the second partial transmission (6) which needs to be engaged, the target gear is engaging in the second partial transmission and the load reduction at the electric machine is executed.

7. The method according to claim 4, further comprising the step of, disengaging the present gear of the disengaging first partial transmission (7) after the execution of the shift under load.

8. The method according to claim 4, further comprising the step of matching the rotational speed of the electric machine (2) for the execution of the shift under load in a way such that a rotational speed synchronization exists at the planetary transmission (10), at a sun gear (14), at a ring gear (15), and at planetary gears (16).

9. The method according to claim 4, further comprising the step of maintaining engagement of the separation clutch, when the combustion engine (1) is linked via the separation clutch (11) to the input shaft of the first partial transmission (6), when the bridging shift element (12) is changed into the load-free condition.

10. The method according to claim 4, further comprising the step of calculating the target torque ($M_{EM-ZIEL}$) of the electric machine (2) based on the following equation:

$$M_{EM-ZIEL}=\text{MIN}(M_{EM-W}; M_{EM-MAX}),$$

$$M_{EM-W}=M_{TG-W}(1-io),$$

where $M_{EM-MAX}$ is a maximum torque provided by the electric machine (2), and $M_{TG-W}$ is the desired torque of the disengaging partial transmission (7) and i0 is the idle gear ratio of the planetary transmission (10) and $M_{Em-W}$ is the ratio of the desired torque of the disengaging partial transmission to the idle gear ratio of the planetary transmission.

11. The method according to claim 10, further comprising the step of calculating the target torque ($M_{VM-ZIEL}$) of the combustion engine (1) based on the following equation:

$$M_{VM-ZIEL}=M_{EM-ZIEL}*(-io).$$

12. A method to operate a drive train comprising a drive assembly (3) having a combustion engine (1) and an electric machine (2), a transmission (5) having at least first and second partial transmissions (6, 7) positioned between the drive aggregate (3) and an output (4), the electric machine (2) being connected, via a planetary transmission (10), to an input shaft (9) of the first partial transmission (7) and to an input shaft (8) of the second partial transmission (6) which is arranged parallel to the first partial transmission (7), and the combustion engine (1) being connectable, via a separation clutch (11), to the input shaft (8) of the second partial transmission (6), and with the separation clutch (11) engaged, being connected, via the planetary transmission (10), to the input shaft (9) of the first partial transmission (7) and a bridging shift element (12) interacting with the planetary transmission (10) such that, when the bridging shift element (12) is engaged, a torsionally fixed connection exits between the electric machine (2), the input shaft (9) of the first partial transmission (7), and the input shaft (8) of the second partial transmission (6), which are therefore forced to rotate at a same rotation speed, and when the bridging shift element (12) is disengaged the torsionally fixed connection between the electric machine (2), the input shaft (9) of the first partial transmission (7) and the input shaft (8) of the second partial transmission (6) is interrupted and so that they can rotate at different rotational speeds, the method comprising the step of:

executing a shift under load by disengaging the first partial transmission (7) and engaging the second partial transmission (6), the previously engaged bridging shift element (12) becomes load-free prior to the execution of the shift under load and is disengaged under the load-free condition;

calculating, from a start torque of the combustion engine (1) and from a start torque of the electric machine (2) and from a desired torque of the disengaging first partial transmission, a nominal value curve for the torque which is provided by the combustion engine from its start torque to its target torque, and calculating a nominal value curve for the torque of the electric machine, from its start torque to its target torque, whereby the torque which is provided by the combustion engine (1) and the torque which is provided by the electric machine (2) track the respective nominal value curve which brings the bridging shift element (12) to the load-free condition; and switching to pure electrical drive when the combustion engine (1) is connected to the input shaft (8) of the second partial transmission (6) via the separation clutch (11), by disengaging the separating clutch (11) and engaging the bridging shift element (12).

13. The method according to claim 12, further comprising the step of, during the pure electric drive, engaging a gear in one of the first partial transmission (7) and the second partial transmission (6).

* * * * *